United States Patent
Cok et al.

(10) Patent No.: US 6,939,012 B2
(45) Date of Patent: *Sep. 6, 2005

(54) LASER IMAGE PROJECTOR

(75) Inventors: Ronald S. Cok, Rochester, NY (US); John P. Spoonhower, Webster, NY (US); Joseph A. Manico, Rochester, NY (US); Edward Covannon, Ontario, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/452,855

(22) Filed: Jun. 2, 2003

(65) Prior Publication Data

US 2004/0239892 A1 Dec. 2, 2004

(51) Int. Cl.[7] .............. G03B 21/26; G03B 21/00; H01S 3/14; H01S 3/0933; H01S 3/09
(52) U.S. Cl. ................. 353/94; 353/31; 353/122; 372/39; 372/70
(58) Field of Search ................. 372/39, 43–50, 372/70–72; 353/7, 28, 30, 31, 122, 85, 29, 42, 94

(56) References Cited

U.S. PATENT DOCUMENTS

| | | | |
|---|---|---|---|
| 6,170,953 B1 | | 1/2001 | Lee et al. ............. 353/82 |
| 6,172,459 B1 | | 1/2001 | Hung et al. ............. 313/506 |
| 6,254,246 B1 | * | 7/2001 | Tiao et al. ............. 362/31 |
| 6,658,037 B2 | * | 12/2003 | Kahen et al. ............. 372/70 |
| 6,807,211 B1 | * | 10/2004 | Cok et al. ............. 372/39 |
| 2003/0035552 A1 | | 2/2003 | Kolano et al. ............. 381/77 |
| 2003/0039036 A1 | | 2/2003 | Kruschwitz et al. ............. 359/707 |
| 2003/0147437 A1 | * | 8/2003 | Kahen ............. 372/39 |
| 2003/0206145 A1 | * | 11/2003 | Spoonhower et al. ............. 345/84 |
| 2004/0166146 A1 | * | 8/2004 | Holloway et al. ............. 424/449 |
| 2004/0179088 A1 | * | 9/2004 | Wong et al. ............. 347/238 |
| 2004/0212603 A1 | * | 10/2004 | Cok ............. 345/175 |

OTHER PUBLICATIONS

Corzine et al., Design of Fabry–Perot Surface–Emitting Lasers with a Periodic Gain Structure, *IEEE Journal of Quantum Electronics*, vol. 25, No. 6, Jun. 1989, pp. 1513–1524.

U.S. Appl. No. 10/272,093, filed by Spoonhower et al, Oct. 16, 2002.

* cited by examiner

*Primary Examiner*—Judy Nguyen
*Assistant Examiner*—Andrew Sever
(74) *Attorney, Agent, or Firm*—Stephen H. Shaw (57) ABSTRACT

A laser image projector includes a substrate; and a two dimensional array of individually addressable laser pixels formed on the substrate for emitting an imagewise beam of laser light perpendicular to the substrate, each of the laser pixels including an addressable organic light emitting diode (OLED) and an organic vertical cavity laser that is arranged to be pumped by the OLED.

25 Claims, 6 Drawing Sheets

(PRIOR ART)

LASER IMAGE PROJECTOR

CROSS REFERENCE TO RELATED APPLICATIONS

Reference is made to U.S. Ser. No. 10/272,093 filed Oct. 16, 2002 by Spoonhower et al., entitled ORGANIC LASER CAVITY ARRAYS.

FIELD OF THE INVENTION

The present invention relates to the field of image projectors.

BACKGROUND OF THE INVENTION

Image projection devices are well known and have been used for many years. Such systems typically rely upon an image modulator and an optical projection means to project the image upon a diffuse screen, whereon it is viewed by an observer. Image modulators were originally hard copy media based, for example, films such as transparencies and motion picture film. More recently, soft copy projectors have become available and are based upon, for example micro electromechanical systems or liquid crystal devices as well as laser projection systems, for example see U.S. patent application 2003/0039036 A1 by Kruschwitz et al., published Feb. 27, 2003. In any case, the image modulator creates an image plane which is projected through an optical system upon a screen as is commonly seen, for example, in a cinema or in digital computer monitor projector. Image projection devices are also employed in head mounted displays.

The optical systems used with image projectors typically include some combination of lenses with a focus control, and often a zoom control. These controls allow the projector to project a focused image upon the screen at a variety of distances and with a variety of displayed image sizes. However, such systems are encumbered by the weight and size of the projection optical system and are restricted to imaging upon a single screen.

U.S. Pat. No. 6,170,953 B1 issued Jan. 9, 2001 to Lee et al. describes a laser video projector for projecting an image to a plurality of screens. However, this system relies upon extensive beam combining optics to integrate the light paths and project image at a plurality of screens.

There is a need therefore for an alternative image projection system that avoids these limitations.

SUMMARY OF THE INVENTION

The need is met according to the present invention by providing a laser image projector that includes a substrate, and a two dimensional array of individually addressable laser pixels formed on the substrate for emitting an imagewise beam of laser light perpendicular to the substrate, each of the laser pixels including an addressable organic light emitting diode (OLED) and an organic vertical cavity laser that is arranged to be pumped by the OLED.

ADVANTAGES

The present invention has the advantage that a projection display is provided that does not need a projection optical system.

DETAILED DESCRIPTION OF THE INVENTION

Figure 1:
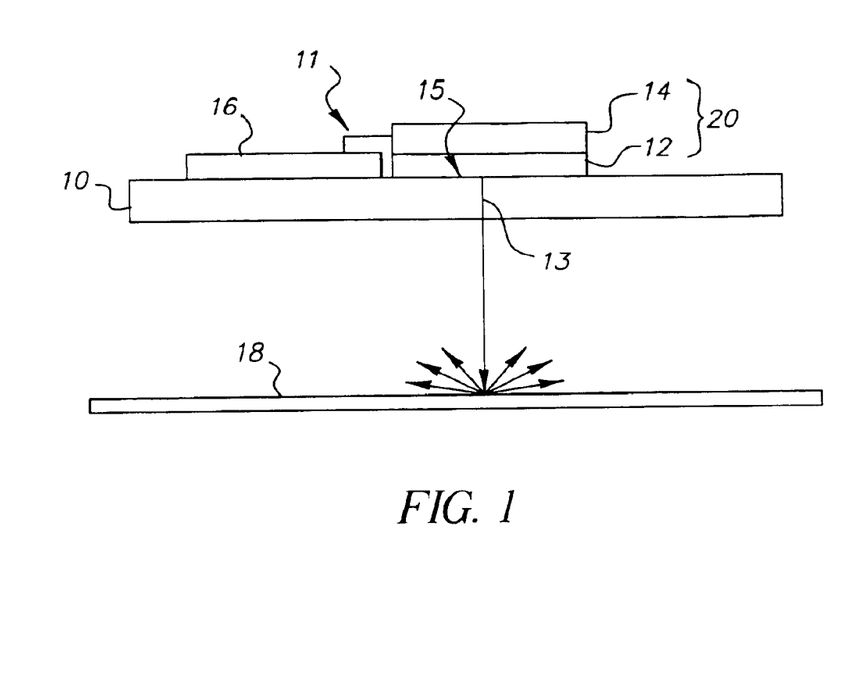
FIG. 1 is a schematic side view of a laser image projector according to the present invention.

Referring to FIG. 1, an individually addressable laser pixel 11 includes an organic laser 12 that is optically pumped by light from an OLED 14 formed on a substrate 10 and electrically controlled through a circuit 16. In a passive matrix projector, circuit 16 simply comprises electrical conductors. In an active matrix projector circuit 16 contains active electronic elements such as transistors and capacitors.

The OLED 14 emits incoherent light 15 to optically pump the organic laser 12 that, in turn, emits laser light 13 perpendicular to the substrate and travels to expose an element such as a light diffusing projection screen 18 where the emitted light is diffused and becomes visible to an observer (not shown). The light diffusing projection screen 18 may be either transmissive or reflective to enable either rear or front viewing.

Figure 2:
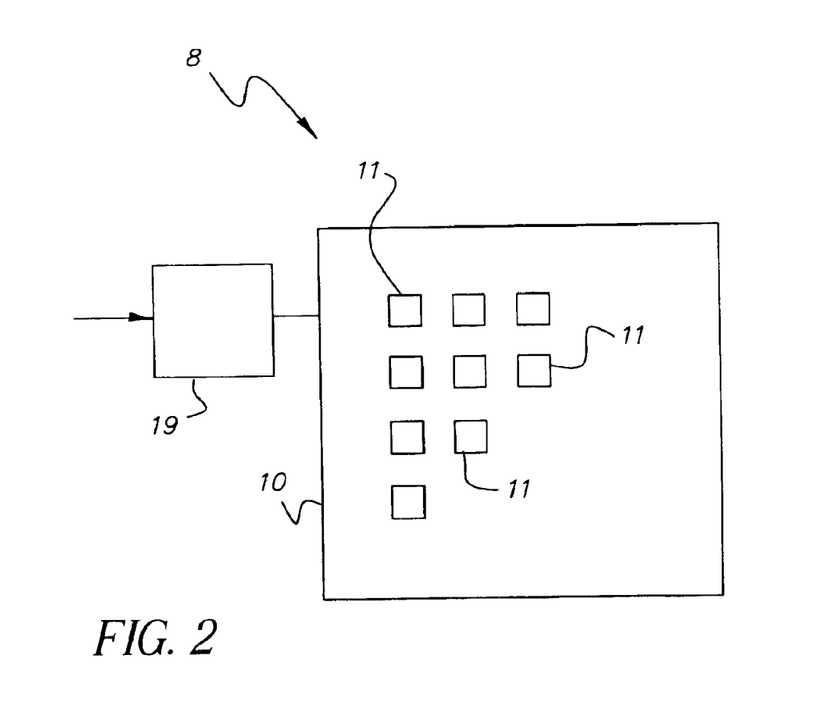
FIG. 2 is a schematic top view of the laser image projector according to the present invention.

Referring to FIG. 2, a laser projector 8 includes an array of individually addressable laser pixels 11 controlled by a controller 19. The individually addressable laser pixels 11 may emit light of different colors to form a color laser image projector. The frequency of light emitted by the light emitting pixels 11 depends upon the frequency of the light emitted by the OLEDs 14 and the materials and construction of the organic lasers 12 as is described below.

In alternative embodiments of the present invention, the element exposed by the laser projector may be a light absorptive element, such as biological tissue. This can be useful, for example, in medical applications where particular frequencies of light may be directed in an imagewise pattern onto biological tissue. Such a laser image projector may be complemented with an image sensor so that a feedback system illuminates particular elements within an image field in real time. Alternatively, the element may be a photosensitive material such as a photoconductor or photographic paper or film. In a further alternative, the laser image projector may be used to illuminate a thermal transfer material used for printing or manufacturing.

Figure 3:
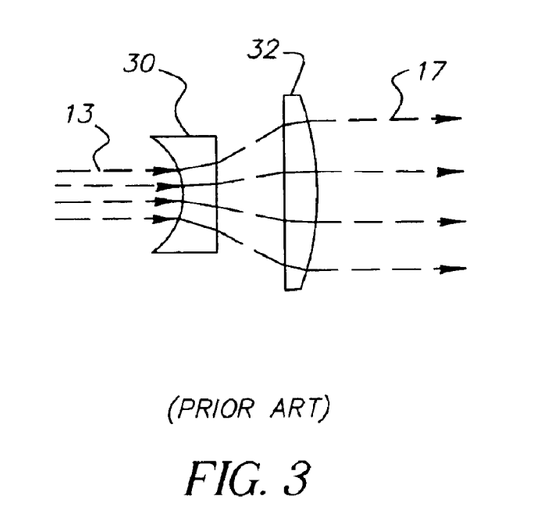
FIG. 3 is a schematic diagram of a prior art beam expander useful with the present invention.

Referring to FIG. 3, a beam expander, such as a Galilean Beam Expander having a plano-concave lens element 30 and a plano-convex lens element 32, can be used to expand or reduce the size of the imagewise beam of laser light 13, for example, to expand the laser light 13 into a broader light beam 17. Such an expander may also be used to control the angular divergence of the light beam 17. The magnification of the beam expander is the ratio of the focal lengths of the two lens elements 30 and 32. The distance between the elements 30 and 32 is the sum of the focal lengths.

Figure 4:
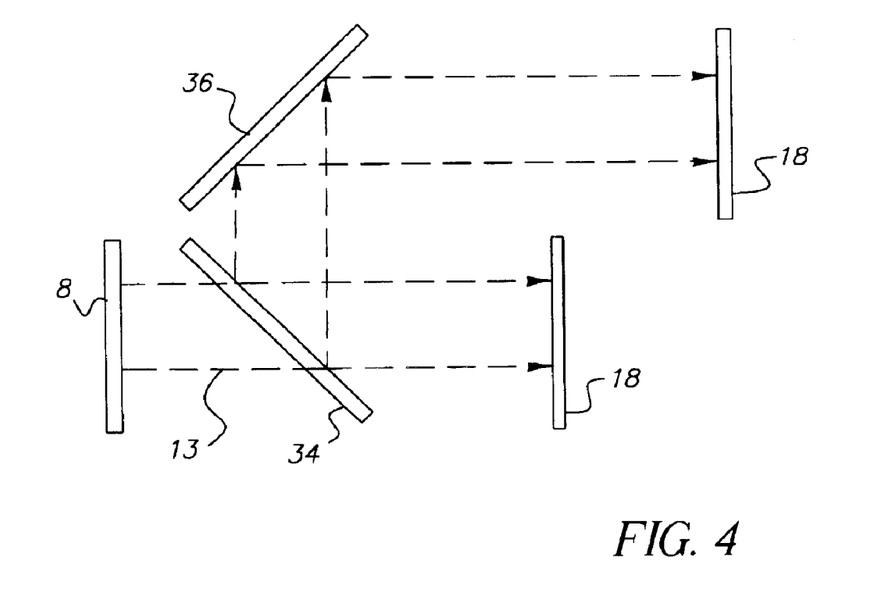
FIG. 4 is a schematic diagram of a beamsplitter and mirror useful with the present invention.

Referring to FIG. 4, optical elements such as beam splitters and mirrors may also be used to divide and redirect the imagewise beam of laser light so that, for example, the laser image projector may transmit light around corners or through complex paths to a desired image location or locations. Because the laser image projector of the present invention can project an image onto a surface at arbitrary distances without the need for projection optics, folding optics (such as mirrors) may be placed in the projection path to project images around corners. It is also possible to move the image, either by moving the laser image projector itself, or by moving the optical elements, for example, by moving the reflective surface of a mirror.

The laser image projector of the present invention can also be employed to project an image onto multiple surfaces at multiple locations by employing a beam splitter. Moreover, because the projection distance is variable, the locations may be at different distances from the laser image projector and may be positioned as described above with appropriately positioned mirrors. Suitable beam splitters and mirrors are well known in the optical arts. Referring to FIG. 4, a laser image projector 8 emits a beam of laser light 13 that is split by a beam splitter 34 and reflected by a mirror 36 to produce an image on reflective light diffusive screens 18 that are positioned at different distances from the laser image projector 8.

Figure 5:
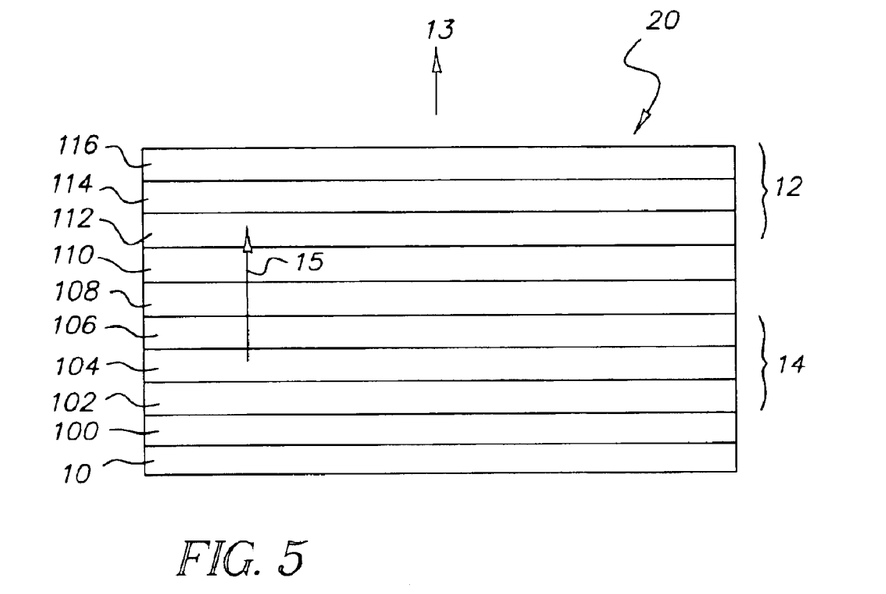
FIG. 5 is a schematic cross section of an OLED pumped organic laser useful with the present invention.

Referring to FIG. 5, a schematic cross section of an electrically pumped organic solid state laser light emitter 20 useful with the present invention includes an OLED 14 and an organic laser 12 and a transparent layer 110 located between the OLED 14 and the organic laser 12. The organic laser 12 is a vertical cavity laser that includes a pair of mirrors 112 and 116 such as distributed Bragg reflector (DBR) mirrors and an active layer 114 that is formed from organic materials which employ a host dopant material system as described below. Transparent layer 110 is an optically transparent insulating planarization layer compatible with the OLED 14, for example silicon dioxide; however, it can be any optically flat layer compatible with OLED 14 and upon which a DBR mirror can be grown. DBR mirror 112 is deposited on the transparent layer 110. It is preferred to be grown by conventional sputtering or electron beam (e-beam) deposition since it is important to get accurate thicknesses for the dielectric layers. The bottom DBR mirror 112 is composed of alternating high and low refractive index dielectric layers, such that, at the wavelength for the laser light 13, its reflectivity is greater than 99.9% and it transmits greater than 90% of the OLED light 120. DBR mirror 112 is composed of $\lambda/4$-thick alternating high and low refractive index dielectric layers in order to get a high-reflectance at the lasing wavelength $\lambda_j$; additional alternating high and low refractive index dielectric layers are also deposited such that there results a broad transmission maximum for the incoherent light 15 emitted by the OLED. Over the DBR mirror 112 is deposited the organic active layer 114, which can be formed by conventional high-vacuum ($10^{-7}$ Torr) thermal vapor deposition or by spin casting from solution. In order to obtain low thresholds, it is preferred that the thickness of the active layer 114 be integer multiples of $\lambda/2$, where $\lambda$ is the lasing wavelength. The lowest thresholds are obtained for the integer multiple being either 1 or 2.

The active layer 114 comprises host and dopant organic molecules. It is preferred that the organic molecules be of small-molecular weight since currently they can be deposited more uniformly. The host materials used in the present invention are selected from any materials that have sufficient absorption of the incoherent light 15 and are able to transfer a large percentage of their excitation energy to a dopant material via Forster energy transfer. Those skilled in the art are familiar with the concept of Forster energy transfer, which involves a radiationless transfer of energy between the host and dopant molecules.

An example of a useful host dopant combination for red emitting lasers is aluminum tris(8-hydroxyquinoline) (Alq) as the host and 4-(dicyanomethylene)-2-t-butyl-6-(1,1,7,7-tetramethyljulolidyl-9-enyl)-4H-pyran (DCJTB) as the red emitting dopant. A DBR mirror 116 is deposited over the active layer 114. It is also deposited by conventional e-beam deposition, however, this time it is preferred that during the deposition process the temperature of the organic stay below 75 C. The top DBR mirror 116 is composed of alternating high and low refractive index dielectric layers, such that, at the wavelength for the laser light 13 its reflectivity is greater than 98% and it reflects greater than 90% of the incoherent light 15. Consequently, besides depositing the $\lambda/4$-thick alternating high and low refractive index dielectric layers (where $\lambda$ is chosen near the desired lasing wavelength), additional alternating high and low refractive index dielectric layers are deposited such that there results a broad reflection maximum for the incoherent light 15. In particular, it is only necessary to reflect that portion of the incoherent light 15 which is absorbed by the active layer 114 host material.

The OLEDs 14 of the organic solid state laser light emitters 20 are one or more electrically driven organic light emitting diode devices which produce incoherent light within a predetermined portion of the spectrum. For an example of an OLED device, see commonly assigned U.S. Pat. No. 6,172,459 issued Jan. 9, 2001 to Hung et al., and the references cited therein, the disclosures of which are incorporated by reference.

The OLED 14 is formed adjacent to, and preferably on, a substrate 10 on which is formed an electrode 100, for example a hole-injecting anode, as shown in FIG. 5. The substrate 10 can be any material suitable for the construction of OLED devices as are described in the art, for example glass or quartz, and the electrode 100 can be a thin layer of indium tin oxide (ITO) or thin layers of conductive metals formed over the substrate 10. The electrode can be deposited by evaporation, sputtering, and chemical vapor deposition.

Figure 6:
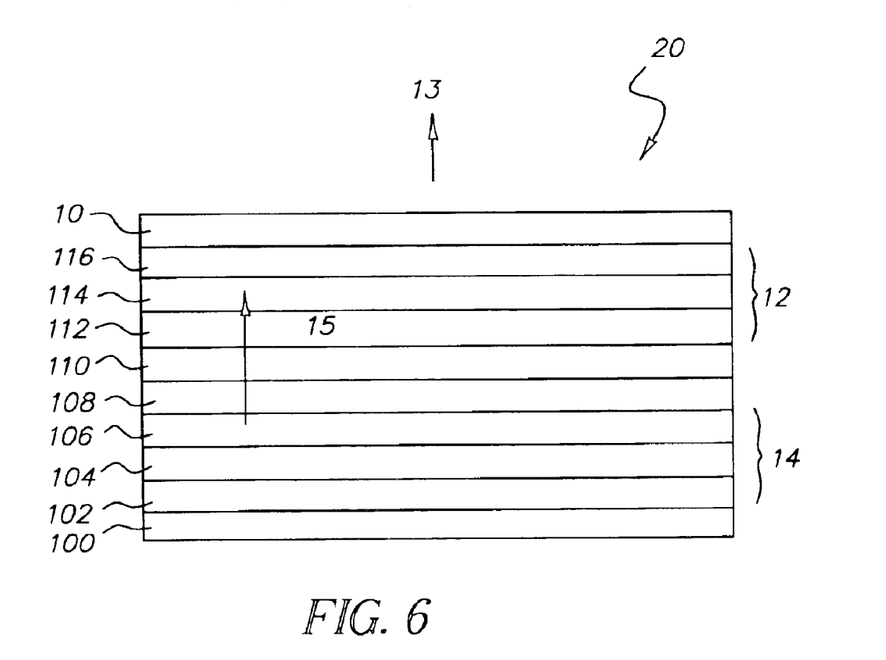
FIG. 6 is a schematic cross section of an alternative OLED pumped organic laser useful with the present invention.

Alternatively, an electrode can be formed on the transparent layer 110 as shown in FIG. 6. An organic hole transport layer 102 is formed over the electrode 100, an organic light emitting layer 104 is formed over the hole transport layer 102, and an organic electron transport layer 106 is formed over the emitting layer 104. As an example for these three layers, a useful structure includes a diamine layer, such as, 4,4'-bis[N-(1-naphthyl)-N-phenylamino] biphenyl (NPB) for the hole transport layer 102, undoped 9,10-Bis(2-naphthalenyl)anthracene (ADN) as the emitter layer 104, and Alq as the electron transport layer 106. These organic layers are typically prepared by high-vacuum thermal evaporation. Their preferred thicknesses are 40–250 nm for the NPB, 10–50 nm for the ADN, and 10–200 nm for the Alq.

A second transparent electrode layer 108 (for example a cathode) is formed over the electron transport layer 106, and of a material selected to have a work function less than 4.0 eV. A suitable transparent electrode layer 108 is indium tin oxide or MgAg, where the Mg—Ag volume ratio is 10:1. It can be formed by conventional thermal vapor deposition. An optically transparent insulating planarization layer 110 is formed over the cathode and the organic laser 12 formed upon the transparent layer 110. Additional layers as are known in the art, can be included in the OLED structure, for example hole injection and electron injection layers. As is well understood in the art, a voltage V can be applied across the electrodes to provide the necessary electric field for causing the light emitting layer to produce the pump beam light, which is transmitted out of the organic light emitting diode device. The voltage V can be continuous or in the form of pulses.

Under typical bias conditions, electrons (negative-charge carriers) will be injected from the electrode layer 108 into the organic electron transport layer 106, and holes (positive charge carriers) will be injected from the electrode 100 into the organic hole transport layer 102. Electrons and holes are transported through the corresponding organic layers 106 and 102 and into the organic light-emitting layer 104. In the organic light emitting layer 104 the electrons and holes mainly recombine near the junction between the hole transport layer 102 and the light emitting layer 104. The resulting recombination results in light emission from the organic light emitting layer 104. Of the light generated in the emitting 10 layer, approximately 50% is directly emitted in the direction of the substrate 10 while the other 50% is emitted directly toward the electrode layer 108. The electrode layer 108 is transparent and allows the light to pass through the transparent layer 110 to optically pump the vertical laser.

The electrode 100 and/or the underlying substrate can be made reflective so that the portion of the light emitted toward the electrode 100 can be reflected out of the device to pass through the transparent insulating planarization layer 110 as well. It is well known in the art that the positions of the anode and cathode and the hole and electron injecting and/or transport layers can be reversed so that, for example, electrode 100 is a cathode and electrode 108 is an anode. In this case, a reflective cathode can be deposited upon the substrate while the anode is transparent.

After exiting the OLED 14, the incoherent light 15 enters the organic laser 12 through the bottom DBR mirror 112. As a result of the bottom DBR mirror design, the majority of that light passes into the active layer 114. By construction, the active layer host absorbs some fraction of the incoherent light 15. Of the fraction of light which did not get absorbed (for cases where the active layer's absorption length is too small), the remaining fraction of light 15 enters the top DBR mirror layer 116, whereby a large fraction of the light is back reflected into the active layer for a second pass. During the second pass, an additional fraction of the incoherent light 15 is absorbed by the active layer host.

Via the Forster energy transfer mechanism, the light energy absorbed by the host is non-radiatively transferred to the dopant molecules. It is preferred that the dopant molecule has a high quantum efficiency for emission since that results in the majority of the non-radiatively transferred energy being re-emitted as longer wavelength light. For example, with ADN as the OLED light emitter material, Alq as the active layer host and DCJTB as the active layer dopant, the emitted OLED light is blue; Alq mainly absorbs in the blue, while DCJTB emits in the red.

The organic laser 12 is designed to be a high-Q cavity for red light, especially for wavelengths where the top and bottom DBR mirrors have their highest reflectivities. Those skilled in the art are familiar with the concept that lasing occurs at a particular wavelength which has the highest net gain. At that wavelength, the laser light 13 reflects many times between the top and bottom DBR mirrors prior to being emitted mainly through the top DBR mirror 116 (since by design the mirror loss of the bottom DBR mirror is much lower than that of the top DBR mirror).

In this embodiment, the organic laser 12 and the electrically driven OLED 14 are combined in an integrated device formed on the substrate 10 with the electrically driven OLED 14 located on the substrate 10 and the organic laser 12 above the OLED 14 and separated from it by the optically transparent planarization layer 110. Consequently, the bottom DBR mirror 112 is composed of alternating high and low refractive index dielectric layers, such that, at the wavelength for the laser light 13, its reflectivity is greater than 99.9% and it transmits greater than 90% of the incoherent light 15. Correspondingly, the top DBR mirror 116 is composed of alternating high and low refractive index dielectric layers, such that, at the wavelength for the laser light 13 its reflectivity is greater than 98% and it reflects greater than 90% of the incoherent light 15.

Referring to FIG. 6, in an alternative embodiment of the present invention, the substrate 10 is transparent and is located adjacent to the organic laser 12, and preferably the organic laser 12 is formed upon the substrate 10, so that light is emitted through the substrate 10.

Figure 7:
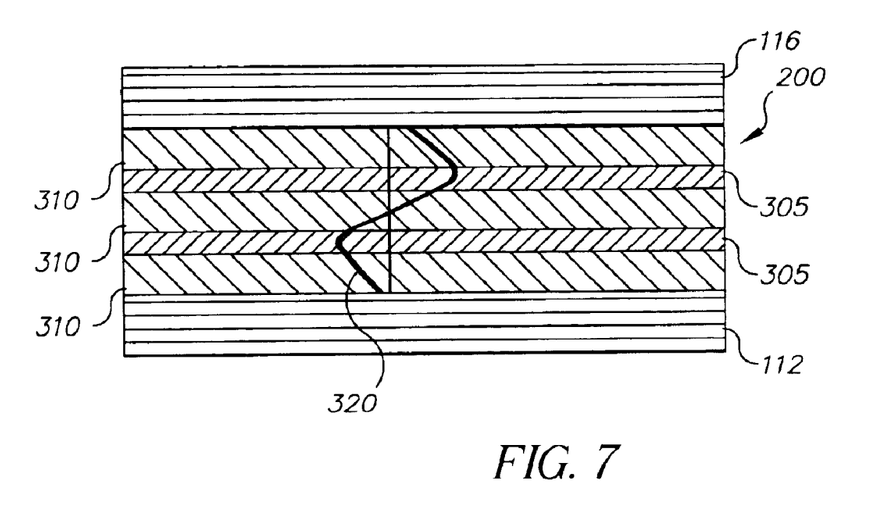
FIG. 7 is a schematic cross section of an organic laser cavity having periodic gain regions useful with the present invention.

The efficiency of the laser can be improved using an active region design for the vertical cavity organic laser structure. Referring to FIG. 7, periodic gain layers 305 are aligned with the antinodes of the device's standing wave electromagnetic field, where the laser's standing wave electromagnetic field pattern 320 in the laser elements 200 is schematically shown. Since stimulated emission is highest at the antinodes and negligible at the nodes of the electromagnetic field, it is inherently advantageous to form the periodic gain layers 305 as shown in FIG. 7, separated by organic spacer layers 310. The organic spacer layers 310 do not undergo stimulated or spontaneous emission and largely do not absorb either the laser light 13 or the pump-beam incoherent light 15 wavelengths. An example of a material suitable for forming an organic spacer layer 310 is the organic material 1,1-Bis-(4-bis(4-methyl-phenyl)-aminophenyl)-cyclohexane (TAPC).

TAPC works well as the spacer material since it largely does not absorb either the laser/output or the pump beam energy and, in addition, its refractive index is slightly lower than that of most organic host materials. This refractive index difference is useful since it helps in maximizing the overlap between the electromagnetic field antinodes and the periodic gain layers 305. As will be discussed below with reference to the present invention, employing periodic gain region(s) instead of a bulk gain region results in higher power conversion efficiencies and a significant reduction of the unwanted spontaneous emission. The placement of the gain region(s) is determined by using the standard matrix method of optics; see Corzine et al., *Design of Fabry-Perot Surface-Emitting Lasers with a Periodic Gain Structure*, IEEE Journal of Quantum Electronics, Vol. 25, No. 6, June 1989. To get good results, the thicknesses of the periodic gain layer(s) 305 need to be at or below 50 nm in order to avoid unwanted spontaneous emission.

Figure 8:
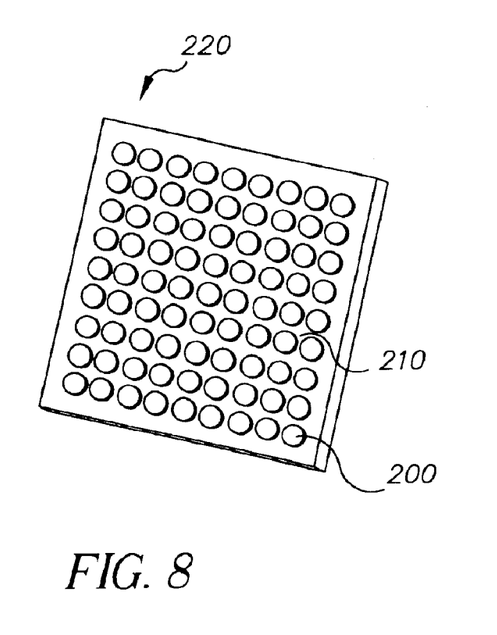
FIG. 8 is a perspective view of a laser pixel formed by an array of phase locked laser elements.

A laser light emitting pixel 11 can be increased in area while maintaining a degree of spatial coherence by utilizing a phase locked organic laser array 220 as depicted in FIG. 8. To form a two dimensional phase locked laser array 220, laser elements 200 separated by inter element spacing 210 need to be defined on the surface of the organic laser 12. To obtain phase locking, intensity and phase information must be exchanged amongst the laser elements 200. This is best obtained by weakly confining the laser emissions to the lasing regions by either small amounts of built-in index or gain guiding, e.g. by modulating the reflectance of one of the mirrors.

In the embodiment shown in FIG. 8, the reflectance modulation is affected by patterning and forming an etched region in the bottom dielectric stack, using standard photolithographic and etching techniques, thus forming a two dimensional array of laser elements 200 in the form of circular pillars on the surface of the bottom dielectric stack. The remainder of the organic laser micro cavity structure is deposited upon the patterned bottom dielectric stack as described above. In this embodiment the shape of the laser elements 200 is circular, however, other shapes are possible, such as rectangular. The inter-element spacing 210 is in the range of 0.25 to 4 $\mu$m.

Phase locked array operation will also occur for larger inter region spacings, however, larger spacings lead to inefficient usage of the optical pumping energy. The etch depth is preferred to be from 200 to 1000 nm deep. By etching just beyond an odd number of layers into the bottom dielectric stack, it is possible to effect a significant shift of the longitudinal mode wavelength in the etched region away from the peak of the gain media. Hence, lasing action is prevented and spontaneous emission is significantly reduced in the area between the laser elements 200. The end result of the formation of the etched region is that the laser emission is weakly confined to the laser elements 200, no lasing originates from the area between the regions, and coherent phase locked laser light is emitted by the laser array 220.

By using a plurality of coherent phase locked laser emitters, a larger addressable emitting area can be formed that emits light of a single wavelength. Different addressable emitting areas can be formed to emit light of different colors to provide a full color image display projection system. It is also possible to construct a single, individually addressable emitting area that emits light of multiple colors, for example a white color. By modifying the inter-element spacing 210 so that the elements are arranged in groups to make laser arrays 220 wherein the inter element spacing 210 between the elements within a group are the same, and the spacing between the groups is sufficiently large as to prevent lasing action between the groups, groups can be constructed to emit light of different colors.

Different OLED materials can be used in association with each group as desired to assist the emission of differently colored light from each group within a single, individually addressed light emitting laser pixel. The individually addressed light emitting laser pixel can thus emit light that is a combination of frequencies. For example, an individually addressed light emitting laser pixel can be made to emit a white light. The white point of the addressable light emitting laser pixel can be controlled by adjusting the ratio of the number of groups emitting differently colored light within the element, for example having one laser array within an addressable light emitting laser pixel larger than another laser array.

Figure 9:
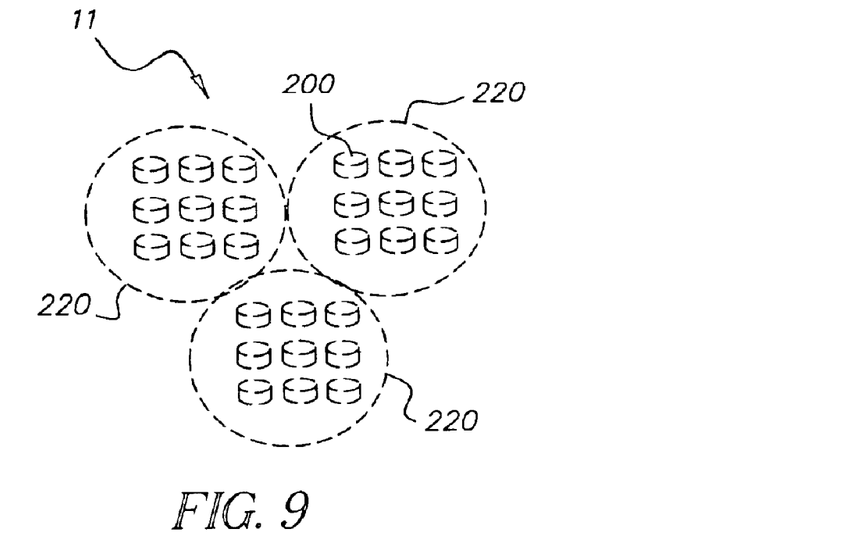
FIG. 9 is a perspective view of a laser pixel formed by separate groups of phase locked laser elements.

Referring to FIG. 9, an individually addressable light emitting laser pixel 11 includes three laser arrays 220 of light emitting elements 200 for emitting light of different colors. Each laser array 220 includes one or more lasing elements 200 wherein all of the lasing elements 200 within a laser array 220 emits light of the same color. As noted above, the laser arrays 220 may have different numbers of elements to provide a specific intensity of light emission from each group. The overall color of light emitted from the laser pixel 11 can be adjusted by adjusting the intensity of light emission from each group, thereby, for example adjusting the white point of a white emitting laser pixel 11. Alternatively, a white emitting pixel 11 may include a mixed group of differently colored laser elements 200 that are not mode locked, but that are arranged in a manner that promotes the mixing of the colors from the laser elements 200.

Figure 10:
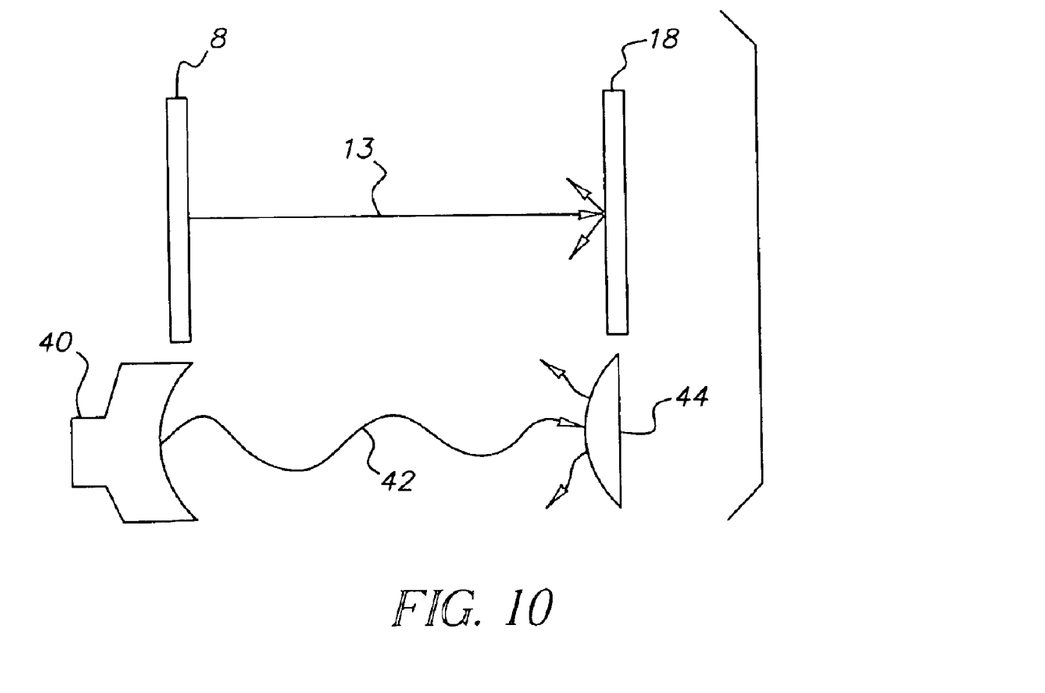
FIG. 10 is a schematic diagram of a laser projector with a sound projector.

Referring to FIG. 10, the laser image projector 8 can be combined with a directed sound system 40 providing a complementary directed sound beam 42, for example as described in U.S. patent application 2003/0035552 A1 by Kolano et al., published Feb. 20, 2003. By providing a diffusive sound reflector 44, a directional audio-visual system is provided that is portable, operates over a wide variety of distances and in a wide variety of circumstances, and is very simple to construct. The sound beam 42 can be directed adjacent to and parallel with the imagewise beam of laser light 13 so as to strike a diffusive sound reflective surface next to a light diffusive projection screen 18 arranged to receive the imagewise beam of laser light 13 or to strike a diffusive sound reflector 44 behind the light diffusing projection screen 18. Sound transparent projection screens are well known in the cinema industry.

Figure 11:
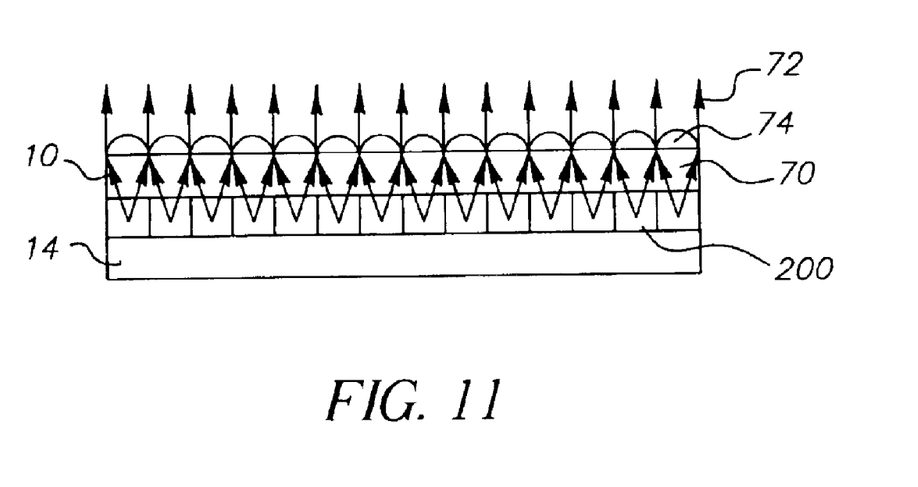
FIG. 11 is a schematic side view of a laser projector according to the present invention including an array of lenslets aligned with the lasers.

Referring to FIG. 11, in some cases the laser element 200 can emit light 70 that is not strictly parallel but has some angular divergence. This divergent light 70 can be collimated into collimated light 72 with the use of lenslets 74 located on the substrate and aligned with the laser element 200. In this case, the addition of the lenslets 70 reduces the performance requirements of the laser element 200 while enabling a flat-panel projector.

The invention has been described in detail with particular reference to certain preferred embodiments thereof, but it will be understood that variations and modifications can be effected within the spirit and scope of the invention.

Parts List 8 laser image projector
10 substrate
11 light emitting pixel
12 organic laser
13 laser light
14 OLED
15 incoherent light
16 circuit
17 broader light beam
18 light diffusing projection screen
19 controller
20 laser light emitter
30 plano-concave lens element
32 plano-convex lens element
34 beam splitter
36 mirror
40 directed sound system
42 sound beam
44 diffusive sound reflector
70 divergent light
72 collimated light
74 lenslets
100 electrode 102 hole transport layer
104 organic light emitting layer
106 organic electron transport layer
108 electrode layer
110 transparent layer
112 DBR mirror
114 active layer
116 DBR mirror
120 OLED light
200 laser element
210 inter element spacing
220 laser array
305 periodic gain layer
310 spacer layer
320 standing wave pattern

What is claimed is:

1. A laser image projector, comprising:
   a) a substrate;
   b) a two dimensional array of individually addressable laser pixels formed on the substrate for emitting an imagewise beam of laser light perpendicular to the substrate, each of the laser pixels including an addressable organic light emitting diode (OLED) formed on the substrate and an organic vertical cavity laser formed on the substrate that is arranged to be pumped by the OLED; and
   c) means responsive to the emitted imagewise beam to project laser light to expose an element.

2. The laser image projector claimed in claim 1, further comprising a projection screen arranged to receive and display the imagewise beam of laser light.

3. The laser image projector claimed in claim 2, wherein the projection screen is a diffuse reflector.

4. The laser image projector claimed in claim 2, wherein the projection screen is a diffuse transparent screen.

5. The laser image projector claimed in claim 1, wherein the laser pixels emit different colors of light to form a color image projector.

6. The laser image projector claimed in claim 1, further comprising a directional audio generator for transmitting a directional audio signal together with the imagewise beam of laser light.

7. The laser image projector claimed in claim 1, further comprising optics for changing the size of the imagewise beam of laser light.

8. The laser image projector claimed in claim 1, further comprising a mirror located in the path of the imagewise beam of laser light for redirecting the path.

9. The laser image projector claimed in claim 1, further comprising a beamsplitter located in the path of the imagewise beam of laser light for creating a second beam of imagewise laser light.

10. The laser image projector claimed in claim 9, further comprising two projection screens arranged at different distances from the laser image projector to receive and display the respective imagewise beams of laser light.

11. The laser image projector claimed in claim 1, wherein each of the individually addressable laser pixels further comprise a plurality of simultaneously addressed individual laser elements.

12. The laser image projector claimed in claim 11, wherein the individual laser elements are separated by inter element regions to form a phase locked laser array.

13. The laser image projector claimed in claim 12, wherein the phase locked laser array is a two dimensional array.

14. The laser image projector claimed in claim 11, wherein the individual laser elements emit differently colored light.

15. The laser image projector claimed in claim 11, wherein the individual elements form groups of phase locked laser arrays that emit different colors of light.

16. The laser image projector claimed in claim 15, wherein the groups emit light of different colors so as to provide a substantially white light from an individually addressable laser pixel.

17. The laser image projector claimed in claim 1, further comprising an array of lenslets aligned with the laser pixels.

18. A method of displaying an image, comprising:
    a) providing a two dimensional array of individually addressable laser pixels formed on a substrate for emitting an imagewise beam of laser light perpendicular to the substrate, each of the laser pixels including an addressable organic light emitting diode (OLED) formed on the substrate and an organic vertical cavity laser formed on the substrate that is arranged to be pumped by the OLED;
    b) employing the two dimensional array of laser pixels to emit an imagewise beam of laser light;
    c) intercepting the imagewise beam of laser light with a diffuse display screen to form a visible image; and
    d) projecting the emitted imagewise beam of laser light to display the image.

19. The method claimed in claim 18, wherein the laser pixels emit different colors of light to form a color image projector.

20. A method of exposing an element to an imagewise pattern of light, comprising:
    a) providing a two dimensional array of individually addressable laser pixels formed on a substrate for emitting an imagewise beam of laser light perpendicular to the substrate, each of the laser pixels including an addressable organic light emitting diode (OLED) formed on the substrate and an organic vertical cavity laser formed on the substrate that is arranged to be pumped by the OLED;
    b) employing the two dimensional array of laser pixels to emit an imagewise beam of laser light; and
    c) directing the imagewise beam of laser light onto the element.

21. The method claimed in claim 20, wherein the element is a biological tissue.

22. The method claimed in claim 21, wherein the element is a light sensitive material.

23. The method claimed in claim 22, wherein the element is photographic paper.

24. The method claimed in claim 23, wherein the element is photographic film.

25. The method claimed in claim 24, wherein the element is a thermal transfer material.

* * * * *